(12) United States Patent
Chen et al.

(10) Patent No.: US 9,778,698 B2
(45) Date of Patent: Oct. 3, 2017

(54) HOUSING, ELECTRONIC DEVICE USING SAME, AND METHOD FOR MAKING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Chia-Hua Chen, Shindian (TW); Choon-Kit Lee, Santa Clara, CA (US); Chao Duan, Shenzhen (CN); Ke-Long Wu, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 132 days.

(21) Appl. No.: 14/677,772

(22) Filed: Apr. 2, 2015

(65) Prior Publication Data
US 2016/0224075 A1 Aug. 4, 2016

(30) Foreign Application Priority Data
Jan. 30, 2015 (CN) .......................... 2015 1 0049839

(51) Int. Cl.
*G06F 1/16* (2006.01)
*H04B 1/3888* (2015.01)
*H04M 1/02* (2006.01)

(52) U.S. Cl.
CPC .......... *G06F 1/1656* (2013.01); *G06F 1/1626* (2013.01); *G06F 1/1658* (2013.01); *H04B 1/3888* (2013.01); *H04M 1/0202* (2013.01); *H04M 1/026* (2013.01); *H04M 1/0249* (2013.01)

(58) Field of Classification Search
CPC .... G06F 1/1656; G06F 1/1626; G06F 1/1658; G06F 1/181; G06F 1/182; G06F 1/1683
USPC .......................... 174/520; 361/679.55–679.56
See application file for complete search history.

(56) References Cited

U.S. PATENT DOCUMENTS

| | | | | |
|---|---|---|---|---|
| 7,142,886 B2 * | 11/2006 | Murayama | ............ | G06F 1/1616 343/702 |
| 2002/0100807 A1 * | 8/2002 | Minaguchi | ............ | G06F 1/1658 235/472.02 |
| 2013/0257659 A1 * | 10/2013 | Darnell | ................... | H01Q 1/243 343/702 |
| 2014/0126172 A1 * | 5/2014 | Fahlgren | ................ | H01Q 1/243 361/814 |
| 2014/0284096 A1 * | 9/2014 | Wu | ......................... | H05K 5/04 174/520 |
| 2016/0116948 A1 * | 4/2016 | Ou | ......................... | G06F 1/1698 361/679.56 |

FOREIGN PATENT DOCUMENTS

| CN | 102268183 A | 12/2011 |
|---|---|---|
| CN | 103582329 A | 2/2014 |
| CN | 104168730 A | 11/2014 |

\* cited by examiner

*Primary Examiner* — Nidhi Thaker
(74) *Attorney, Agent, or Firm* — Steven Reiss (57) ABSTRACT

A housing includes two base each having at least one sidewall, a gap defined between the two bases and a non-conductive member positioned in the gap, the sidewall has a plurality of grooves, the non-conductive member is filled into the grooves to enhance bonding strength between the non-conductive member and the two bases. An electronic device having the housing and a method of making the housing are also provided.

14 Claims, 6 Drawing Sheets

HOUSING, ELECTRONIC DEVICE USING SAME, AND METHOD FOR MAKING SAME

FIELD

The subject matter herein generally relates to a housing, an electronic device using the housing, and a method for making the housing.

BACKGROUND

Metal housings are widely used for electronic devices such as mobile phones or personal digital assistants (PDAs). Antennas are also important components in electronic devices. However, the signal of the antenna located in the metal housing is often shielded by the metal housing.

BRIEF DESCRIPTION OF THE FIGURES

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 1:
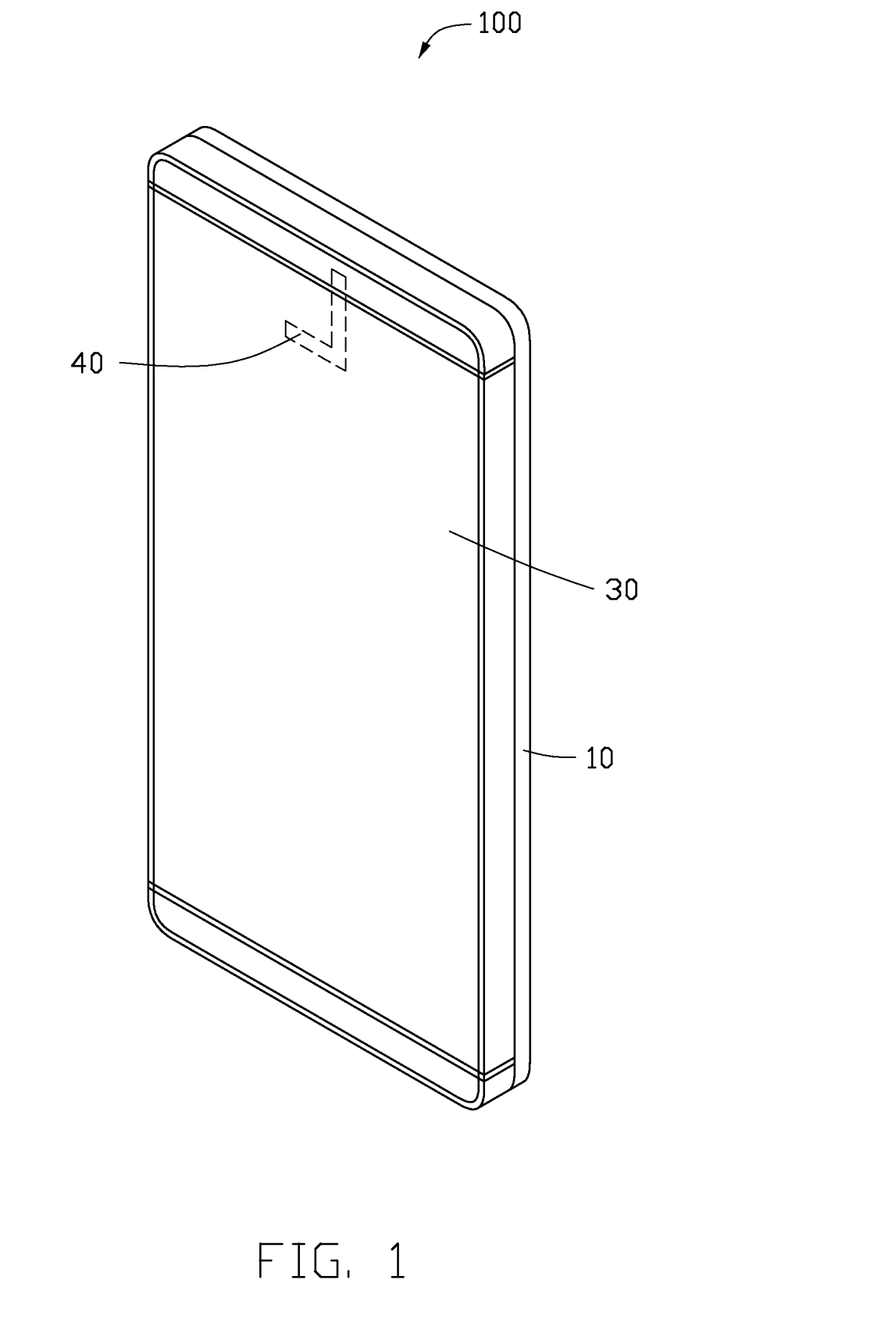
FIG. 1 is an isometric view of an electronic device, according to an exemplary embodiment.

FIG. 1 illustrates an electronic device 100 according to an exemplary embodiment. The electronic device 100 can be, but not limited to, a mobile phone, a personal digital assistant or a tablet computer. The electronic device 100 includes a body 10, a housing 30 assembled to the body 10, and an antenna 40 located inside the housing 30.

The body 10 can have a printed circuit board (PCB) (not shown) and a battery (not shown) electronically connected with the PCB. The battery can charge the electronic device 100.

Figure 2:
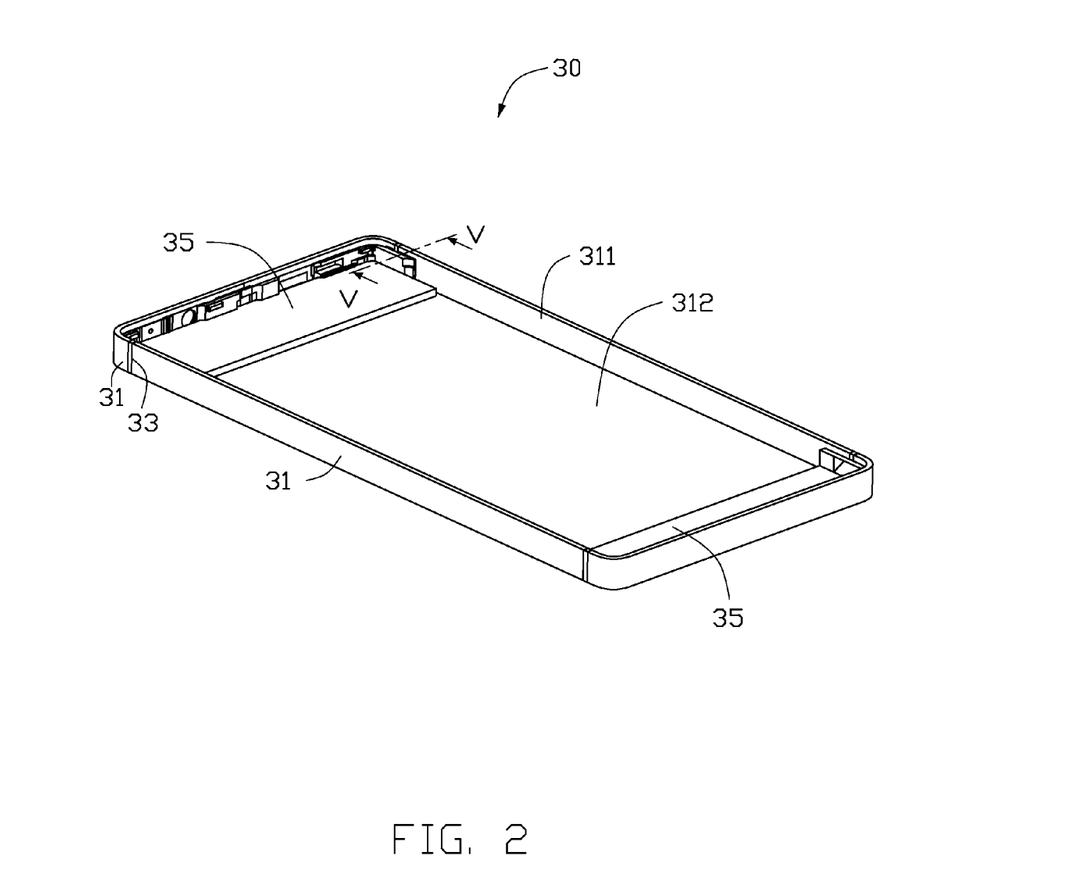
FIG. 2 is an isometric view of a housing of the electronic device shown in FIG. 1.

FIG. 2 illustrates that in one exemplary embodiment, the housing 30 can be a back cover of the electronic device 100. The housing 30 can include at least one base 31 and at least one gap 33 and at least one non-conductive member 35. At least a portion of the non-conductive member 35 can be positioned in the gap 33.

Figure 3:
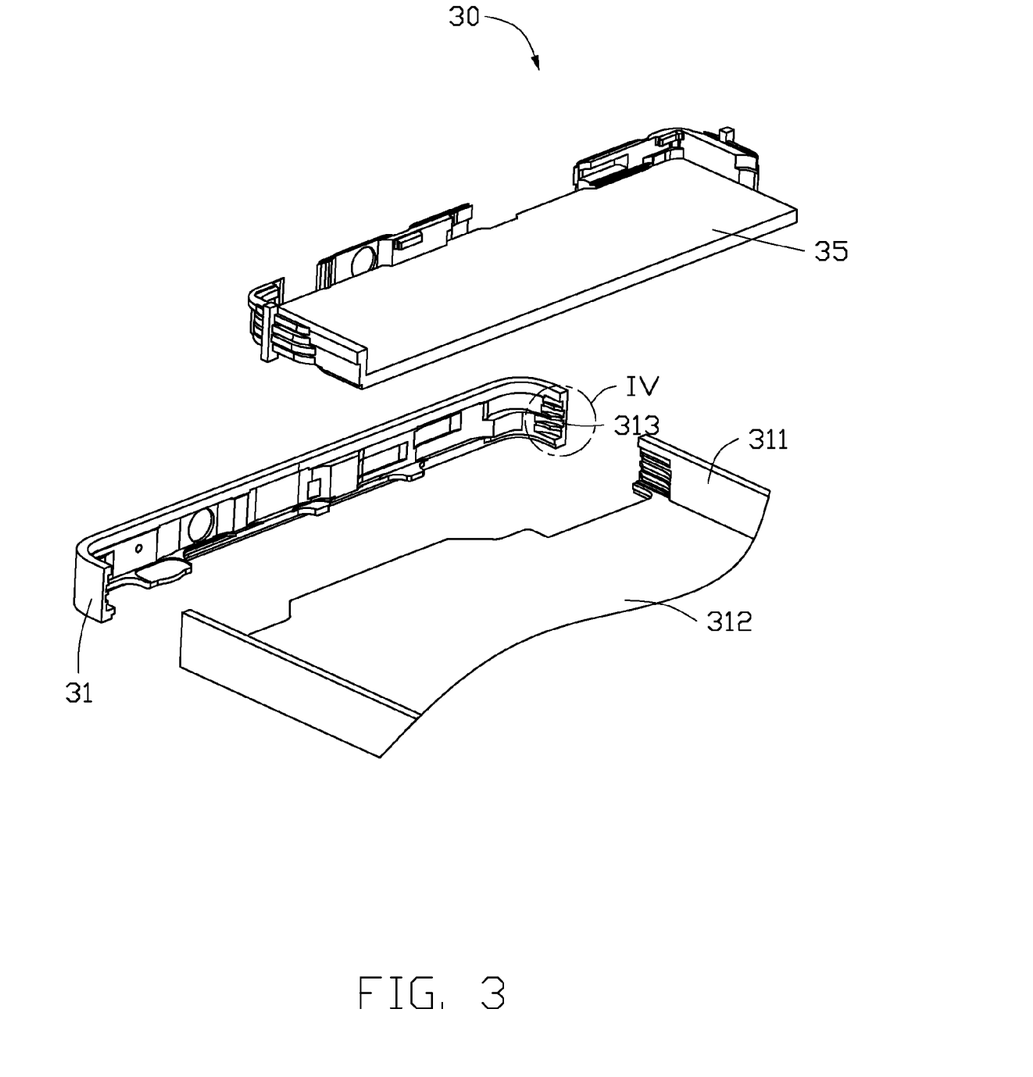
FIG. 3 is an exploded, isometric view of the housing shown in FIG. 2, according to an exemplary embodiment.

FIG. 3 illustrates that each base 31 includes two opposite sidewalls 311 and an internal surface 312 adjacent to the sidewalls 311. The base 31 can be made of a metal which can be selected from a group consisting of aluminum, aluminum alloy, magnesium, magnesium alloy, titanium, titanium alloy, copper, copper alloy and stainless steel.

Figure 4:
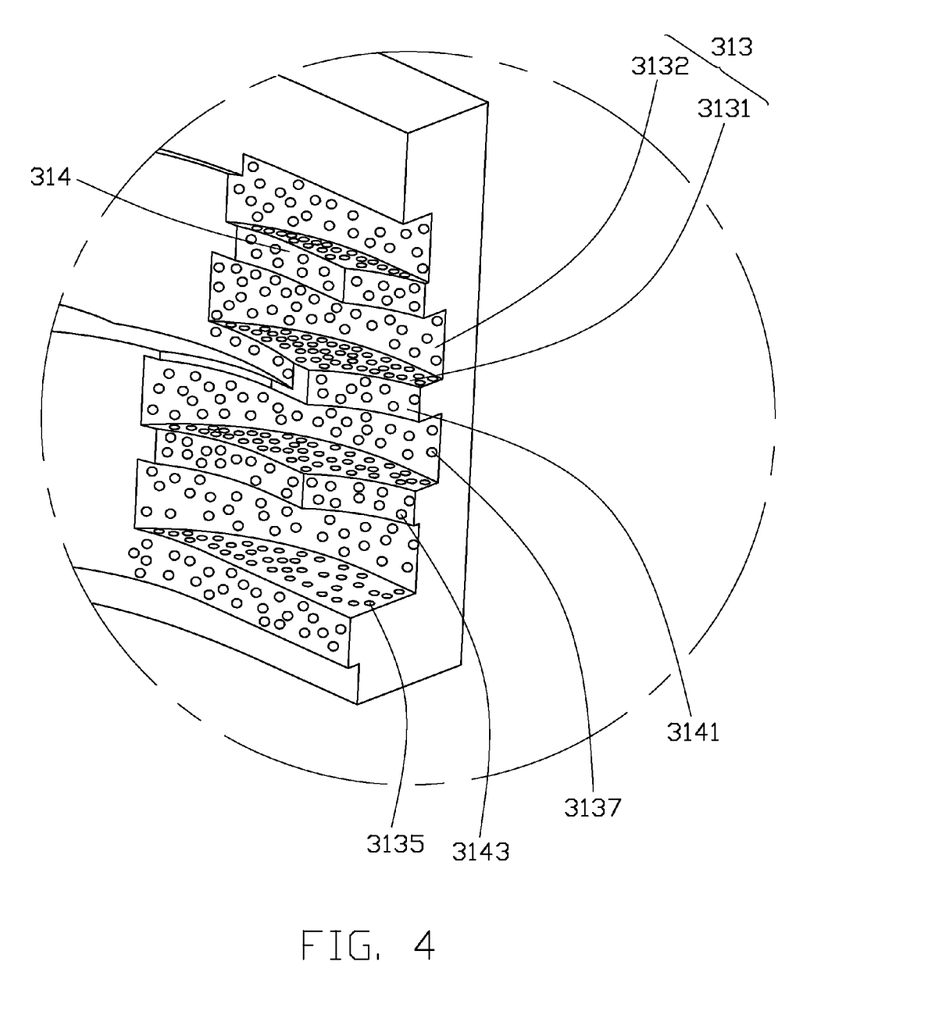
FIG. 4 is an enlarged, isometric view of a circled portion IV shown in FIG. 3.
Figure 5:
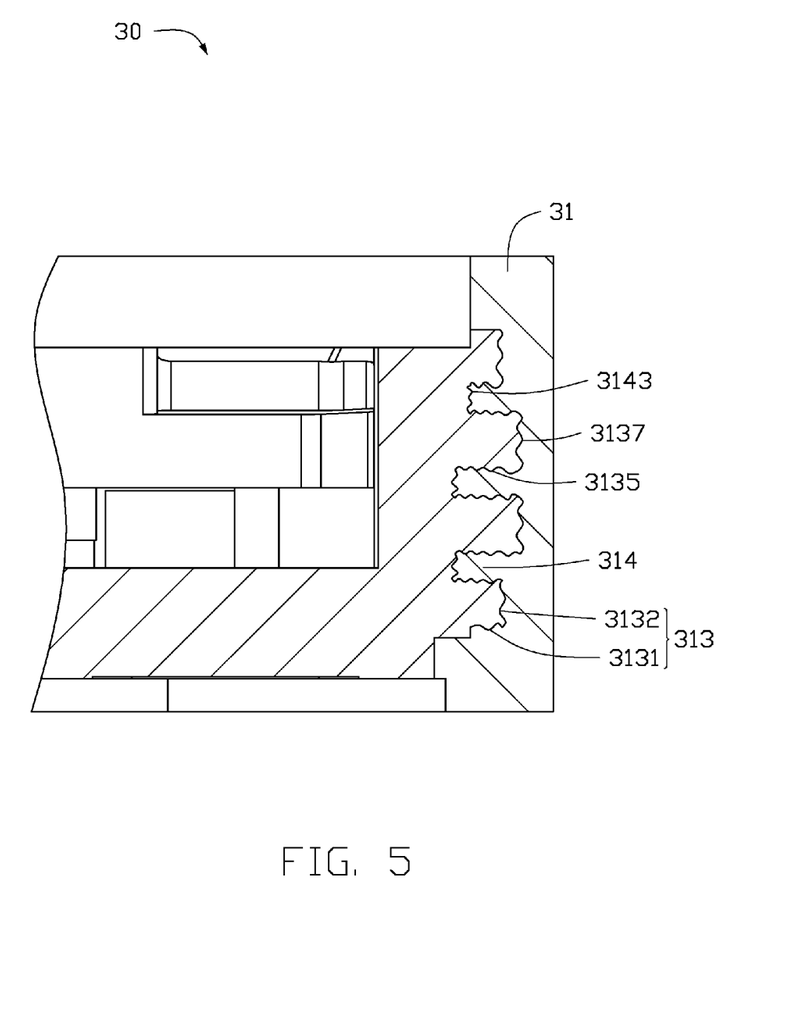
FIG. 5 is a cross-sectional view of the housing along line V-V of FIG. 2.

FIGS. 4-5 illustrate that each sidewall 311 has a plurality of grooves 313 and a plurality of partitions 314, the partitions 314 are respectively located between two adjacent grooves 313. Two opposite lateral surfaces 3131 and a bottom surface 3132 cooperatively form one groove 313. Each partition 314 includes a top surface 3141 adjacent to the lateral surfaces 3131. The lateral surfaces 3131 can have a plurality of holes 3135, the bottom surfaces 3132 can have a plurality of holes 3137, the top surfaces 3141 also have a plurality of holes 3143. The holes 3135, 3137, 3143 have a diameter of about 10 nm to about 300 nm. The holes 3135, 3137, 3143 can be formed through a surface treatment process, such as an anodic oxidation process, a chemical etching process, a chemical dipping process or an electrochemical etching process.

It is to be understood that, the holes 3135, 3137, 3143 are directly formed on the lateral surfaces 3131, the bottom surfaces 3132 and the top surfaces 3141, and the lateral surfaces 3131, the bottom surfaces 3132 and the top surfaces 3141 does not have oxide films after the surface treatment process.

In alternative embodiment, the lateral surfaces 3131, the bottom surfaces 3132 and the top surfaces 3141 all have oxide films (not shown) after the surface treatment process. The oxide films have the holes 3135, 3137, 3143. The holes 3135, 3137, 3143 of the oxide films have a diameter of about 10 nm to about 300 nm.

It is to be understood that, portions of the base 31 can be coated with a protective layer (not shown), such that only the lateral surfaces 3131, the bottom surfaces 3132 and the top surfaces 3141 can have holes 3135, 3137, 3143 after the surface treatment process.

In alternative embodiment, the base 31 is not coated with the protective layer, such that all surfaces of the base 31 can form holes.

The gap 33 has a width of about 0.1 mm to about 0.3 mm. The width of the gap 33 can be changed according to the need of the housing 30.

In at least one exemplary embodiment, the number of the gaps 33 can be two, the two gaps 33 can be formed on the two opposite end of the housing 30. The housing 30 can be spaced by the gaps 33, and forming three bases 31.

In alternative embodiments, the number of the gap 33 can be one, the gap 33 is located at one end of the housing 30. The housing 30 can be spaced by the gap 33, and forming two bases 31.

In alternative embodiments, the number of the gap 33 can be one, the gap 33 is located within the housing 30.

The at least one non-conductive member 35 can be respectively positioned in the at least one gap 33 to bond the at least one base 31 together. The non-conductive member 35 can further cover at least a portion of the sidewalls 311 and internal surface 312, and fill the grooves 313 and holes 3135, 3137, 3143, forming the housing 30. Portions of each non-conductive member 35 filled in the groove 313 and holes 3135, 3137, 3143 can enhance bonding strength between the non-conductive member 35 and the base 31. The portions of the non-conductive member 35 filled in the groove 313 and holes 3135, 3137, 3143 have a width of about 0.1 mm to about 0.3 mm.

It is to be understood that, portions of the non-conductive member 35 can fill the grooves 314 located between two adjacent partitions 314, such that the non-conductive member 35 can be positioned in the grooves 314, another portions of the non-conductive member 35 can be engaged in the holes 3135, 3137, 3143, such that the non-conductive member 35 can be strongly bond with the base 31.

When the non-conductive member 35 is broke away from the base 31 along a direction perpendicular to the base 31, as the non-conductive member 35 is engaged in the grooves 313 and the holes 3135, 3137, 3143, and direction of the axis of the holes 3135 are perpendicular to the breaking direction, such that it is hard to break the non-conductive member 35 from the base 31 along a direction perpendicular to the base 31.

It is to be understood that the direction of axis of the holes 3135 is a direction extending from openings of the holes 3135 to the bottom of the holes 3135.

When the non-conductive member 35 is broken away from the base 31 along a direction parallel to the base 31, as the non-conductive member 35 is engaged in the grooves 313 and the holes 3135, 3137, 3143, and direction of the axis of the holes 3137, 3143 are perpendicular to the breaking direction, such that it is hard to break the non-conductive member 35 from the base 31 along a direction parallel to the base 31.

It is to be understood that the direction of axis of the holes 3137, 3143 is a direction extending from openings of the holes 3137, 3143 to the bottom of the holes 3137, 3143.

The non-conductive member 35 can be made of a resin or a ceramic. The resin can be selected from a group consisting of polybutylene terephthalate (PBT), polyphenylene sulfide (PPS), polyamide (PA), polyethylene terephthalate (PET), polytrimethylene terephthalate (PTT), polyetherimide (PEI), polyether ether ketone (PEEK), poly(ethylene-co-1,4-cyclohexylenedimethylene terephthalate) (PCT), and their modified materials, such as a polyurethane ultraviolet curing resin composition. For example, fiberglass may be added to PPS. The fiberglass may have a mass percentage of about 20-40%.

The antenna 40 is positioned adjacent to and aligns with the gap 33, signal of the antenna 40 can pass through the gap 33, such that the electronic device 100 can have a high radiation efficiency.

Figure 6:
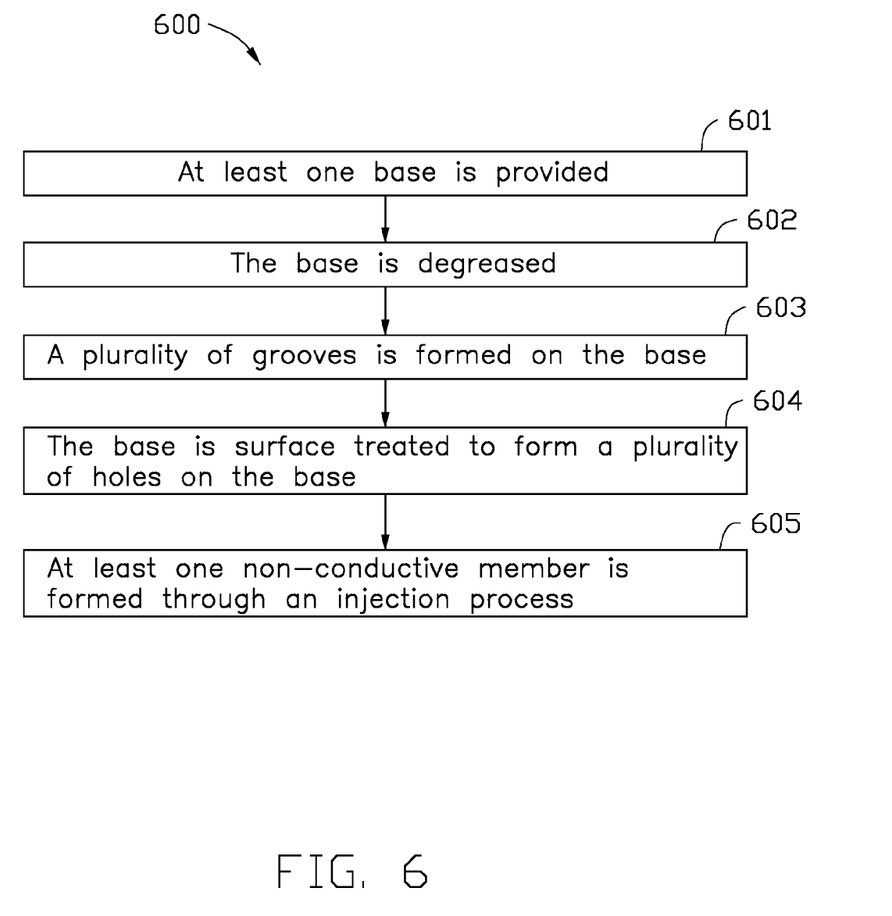
FIG. 6 is a flow chart of a method for making a housing in accordance with an exemplary embodiment.

Referring to FIG. 6, a flowchart is presented in accordance with an example embodiment. The method 600 is provided by way of example, as there are a variety of ways to carry out the method. The method 600 described below can be carried out using the configurations illustrated in FIGS. 1-5, for example, and various elements of these figures are referenced in explaining example method 600. Each block shown in FIG. 6 represents one or more processes, methods or subroutines, carried out in the example method 600. Furthermore, the order of blocks is illustrative only and the order of the blocks can change according to the present disclosure. Additional blocks can be added or fewer blocks can be utilized, without departing from this disclosure. The method 600 for making the housing 30 can begin at block 601.

At block 601, at least one base 31 is provided. In at least one exemplary embodiment, the number of the bases 31 can be three, the bases 31 are spaced by two gaps 33. In alternative embodiments, the number of the bases 31 can be two, one gap 33 is located between the two bases 31. In alternative embodiments, the number of the base 31 can be one, one gap 33 is formed with the base 31, the gap 33 has a width of about 0.1 mm to about 0.3 mm.

Each base 31 includes two opposite sidewall 311 and an internal surface 312 adjacent to the sidewalls 311. The base 31 can be made of a metal which can be selected from a group consisting of aluminum, aluminum alloy, magnesium, magnesium alloy, titanium, titanium alloy, copper, copper alloy and stainless steel.

At block 602, the base 31 is degreased. The degreasing process can include dipping the base 31 in a degreaser for about 5 minutes to about 15 minutes. The degreaser includes sodium carbonate having a concentration of about 30-50 g/L, sodium phosphate having a concentration of about 30-50 g/L, sodium silicate having a concentration of about 3-5 g/L. The temperature of the degreaser can be about 50° C. to about 60° C. Once degreased, the base 31 can be rinsed with water.

At block 603, a plurality of grooves 313 is formed on the sidewalls 311 by cutting the base 31. Two opposite lateral surfaces 3131 and a bottom surface 3132 cooperatively form a groove 313. A plurality of partitions 314 is respectively located between two adjacent grooves 313. Each partition 314 includes a top surface 3141 adjacent to the sidewalls 3131. In at least one exemplary embodiment, each sidewall has four grooves 313. The base 31 can be cut through a laser cutting process or a CNC process.

At block 604, the base 31 is surface treated to form a plurality of holes 3135 on the lateral surfaces 3131, a plurality of holes 3137 on the bottom surface 3132, a plurality of holes 3143 on the top surface 3141. The holes 3135, 3137, 3143 have a diameter of about 10 nm to about 300 nm. The holes 3135, 3137, 3143 can be formed by any of the following four methods:

In a first method, the base 31 can be electrochemically etched to form the holes 3135, 3137, 3143. The holes 3135, 3137, 3143 have a diameter of about 20 nm to about 60 nm. The electrochemical etching process may be carried out in an acidic solution containing sulfuric acid and phosphoric acid, with the base 31 being an anode, and a stainless steel board or a lead plate being a cathode. The sulfuric acid may have a concentration of about 30-50 ml/L, and the phosphoric acid may have a concentration of about 20-60 ml/L. The electric current density through the acid solution is about 2-4 ampere per square decimeter (A/dm$^2$). Electrochemical etching the metal sheet 311 and the main body 313 can last for about 8 minutes to about 15 minutes, which is considerably less time and more effective than an anodizing process (about 20-60 minutes). Next, the base 313 can be rinsed with water and then dried. An energy dispersive spectrometer (EDS) test indicates that no alumina or other oxide film forms on the lateral surfaces 3131, the bottom surfaces 3132 and the top surfaces 3141 after the base 31 is electrochemically etched.

In a second method, the base 31 can be dipped in an aqueous solution at a temperature of about 40° C. to about 70° C. to form holes 3135, 3137, 3143 having a diameter of about 30 nm to about 300 nm. The dipping process can last for about 10-30 minutes. The aqueous solution can include a nitrogen-containing compound having a mass percentage of about 3-10%, and water having a mass percentage of about 90-97%. In the dipping process, the holes 3135, 3137, 3143 can adsorb the nitrogen-containing compound attributable to hydrazine to surfaces of the holes 3135, 3137, 3143. An energy dispersive spectrometer (EDS) test indicates that no alumina or other oxide film forms on the lateral surfaces 3131, the bottom surfaces 3132 and the top surfaces 3141 after the dipping process.

The nitrogen-containing compound can be one or more selected from a group consisting of ammonia, hydrazine, and a water-soluble amine compound. The water-soluble amine compound can be selected from a group consisting of aminomethane ($CH_3NH_2$), dimethylamine (($CH_3)_2NH$), trimethylamine (($CH_3)_3N$), ethylamine ($C_2H_5NH_2$), diethylamine (($C_2H_5)_2NH$), triethylamine (($C_2H_5)_3N$), ethylene diamine ($H_2NCH_2CH_2NH_2$), ethanolamine ($HOCH_2CH_2NH_2$), allylamine ($CH_2CHCH_2NH_2$), diethanolamine (($HOCH_2CH_2)_2NH$), aniline ($C_6H_7N$) and triethanol amine (($HOCH_2CH_2)_3N$).

In a third method, the base 31 can be treated by an anodizing process to form oxide layers (not shown) having a plurality of holes 3135, 3137, 3143. The holes 3135, 3137, 3143 can have a diameter of about 10 nm to about 200 nm.

The anodizing process may be carried out in an acid water solution containing sulfuric acid at about 10° C. to about 30° C., with the base 31 being an anode, and a stainless steel board or a lead plate being a cathode. The sulfuric acid can have a mass percentage of about 10% to about 30%. The voltage can be about 10 V to about 100 V. The anodizing process can last for about 1 minute to about 4 minutes. The anodizing process can be carried in a conventional anodic oxidation device.

In a fourth method, the base 31 can be chemically etched to form a plurality of holes 3135, 3137, 3143 having a diameter of about 30 nm to about 55 nm. The chemical etching can be acid chemical etching or alkali chemical etching.

The acid chemical etching can be carried out by dipping the base 31 in an acid solution for about 1 minute to about 10 minutes to remove any residue of oxidation, and form a plurality of holes 3135, 3137, 3143. The holes 3135, 3137, 3143 can have a diameter of about 30 nm to about 55 nm. The acid solution may be a conventional acid solution. The acid solution in this embodiment can have a concentration of about 30 ml/L to about 80 ml/L. The temperature of the acid solution can be about 20° C. to about 30° C. Next, the metal sheet 311 and the main body 313 can be removed from the acid solution and rinsed with water. An energy dispersive spectrometer (EDS) test indicates that no alumina or other oxide film forms on the lateral surfaces 3131, the bottom surfaces 3132 and the top surfaces 3141 after the dipping process.

Alkali chemical etching can be carried out by repeatedly dipping the base 31 in an alkali solution to form a plurality of holes 3135, 3137, 3143. The holes 3135, 3137, 3143 can have a diameter of about 20 nm to about 200 nm. The number of repetitions can be about 10 times to about 40 times, and each dipping may last for about 1 minute to about 3 minutes. After each dipping process, the base 31 can be removed from the alkali chemical solution and rinsed with water. An energy dispersive spectrometer (EDS) test indicates that no alumina or other oxide film forms on the lateral surfaces 3131, the bottom surfaces 3132 and the top surfaces 3141 after the dipping process.

The alkali chemical solution can include a salt having a mass percentage of about 1-5%, and water having a mass percentage of about 95-99%. The salt can be one or more selected from a group consisting of sodium phosphate, sodium carbonate, acetate salt and sulfite salt. The sodium carbonate can be one or more selected from a group consisting of sodium carbonate, sodium bicarbonate, ammonium acid carbonate, and potassium carbonate. The sodium phosphate can be one or more selected from a group consisting of sodium phosphate tribasic. The acetate can be sodium acetate. The sulfite can be one or more selected from a group consisting of sodium sulfate, sodium bisulfate, potassium sulfite and ammonium sulfite.

It is to be understood that, portions of the base 31 can be coated with a protective layer (not shown), such that only the lateral surfaces 3131, the bottom surfaces 3132 and the top surfaces 3141 can form holes 3135, 3137, 3143 after the surface treatment process.

In alternative embodiment, the base 31 is not coated with the protective layer, such that all surfaces of the base 31 can form holes.

At block 605, at least one non-conductive member 35 is formed in the base 31, such forming the housing 30. The non-conductive member 35 has a width of about 0.1 mm to about 0.3 mm.

The non-conductive element 35 can be formed by an injection process. The injection process includes providing an injection mold (not shown) which includes a core insert and a cavity insert. The core insert can have several gates, and several first cavities. The cavity insert can have a second cavity for receiving the base 31.

In at least one exemplary embodiment, the bases 31 can be located in the second cavity, the bases 31 can be spaced by the gaps 33 having a width of about 0.1 mm to about 0.3 mm. Molten resin is injected through the gates to fill the gaps 33 to bond the bases 31 together, the resin also covers at least a portion of the sidewalls 311 and internal surfaces 312 and fill the grooves 313 and holes 3135, 3137, 3143, forming the non-conductive elements 35, such that the housing 30 is formed. During the molding process, the injection mold may be at a temperature of about 120° C. to about 140° C. Portions of each non-conductive member 35 filled in the groove 313 and holes 3135, 3137, 3143 can enhance bonding strength between the non-conductive members 35 and the bases 31. The portions of each non-conductive member 35 filled in the groove 313 and holes 3135, 3137, 3143 have a width of about 0.1 mm to about 0.3 mm.

In alternative embodiments, the number of the base 31 can be one, the gap 33 is formed within the base 31, the gap 33 has a width of about 0.1-0.3 mm, molten resin is injected through the gates to fill the gap 33, the resin also covers at least a portion of the sidewalls 311 and internal surfaces 312 and fill the grooves 313 and holes 3135, 3137, 3143, forming the non-conductive element 35, such that the housing 30 is formed. Portions of the non-conductive member 35 filled in the groove 313 and holes 3135, 3137, 3143 can enhance bonding strength between the non-conductive member 35 and the base 31. The portions of the non-conductive member 35 filled in the groove 313 and holes 3135, 3137, 3143 have a width of about 0.1 mm to about 0.3 mm.

The non-conductive member 35 can be made of a resin or a ceramic. The resin can be selected from a group consisting of polybutylene terephthalate (PBT), polyphenylene sulfide (PPS), polyamide (PA), polyethylene terephthalate (PET), polytrimethylene terephthalate (PTT), polyetherimide (PEI), polyether ether ketone (PEEK), poly(ethylene-co-1,4-cyclohexylenedimethylene terephthalate) (PCT), and their modified materials, such as a polyurethane ultraviolet curing resin composition. For example, fiberglass may be added to PPS. The fiberglass may have a mass percentage of about 20-40%.

It is to be understood that, portions of the non-conductive member 35 can fill the grooves 314 located between two adjacent partitions 314, such that the non-conductive member 35 can be position in the grooves 314, another portions of the non-conductive member 35 can be engaged in the holes 3135, 3137, 3143, such that the non-conductive member 35 can be strongly bond with the base 31.

When the non-conductive member 35 is broke away from the base 31 along a direction perpendicular to the base 31, as the non-conductive member 35 is engaged in the grooves 313 and the holes 3135, 3137, 3143, and direction of the axis of the holes 3135 are perpendicular to the breaking direction, such that it is hard to break the non-conductive member 35 from the base 31 along a direction perpendicular to the base 31.

It is to be understood that the direction of axis of the holes 3135 is a direction extending from openings of the holes 3135 to the bottom of the holes 3135.

When the non-conductive member 35 is broke away from the base 31 along a direction parallel to the base 31, as the non-conductive member 35 is engaged in the grooves 313 and the holes 3135, 3137, 3143, and direction of the axis of the holes 3137, 3143 are perpendicular to the breaking direction, such that it is hard to break the non-conductive member 35 from the base 31 along a direction parallel to the base 31.

It is to be understood that the direction of axis of the holes 3137, 3143 is a direction extending from openings of the holes 3137, 3143 to the bottom of the holes 3137, 3143.

Tensile strength and shear strength of the housing 30 have been tested, indicating that the tensile strength of the housing 30 can be about 100 MPa, and the shear strength of the housing 30 can be about 200 MPa. Furthermore, the housing 30 has been subjected to a temperature humidity bias testing (72 hours, 85° C., relative humidity: 85%) and a thermal shock test (48 hours, −40-85° C., 4 hours/cycle, 12 cycles total), such testing did not result in decreased tensile strength and shear strength of the housing 30.

It is to be understood, however, that even through numerous characteristics and advantages of the present disclosure have been set forth in the foregoing description, together with details of assembly and function, the disclosure is illustrative only, and changes may be made in detail, including in the matters of shape, size, and arrangement of parts within the principles of the disclosure to the full extent indicated by the broad general meaning of the terms in which the appended claims are expressed.

What is claimed is:

1. A housing comprising: two bases each having an internal surface and at least one sidewall, the internal surface adjacent to the sidewall and the sidewall having a plurality of grooves; a gap defined between the two bases; and a non-conductive member being positioned in the gap, and filled into the grooves to enhance bonding strength between the non-conductive member and the two bases; wherein each groove has two opposite lateral surfaces and a bottom surface adjacent to the lateral surfaces, a plurality of partitions are located between two adjacent grooves, each partition includes a top surface; the lateral surfaces, the bottom surfaces and the top surfaces all have holes, the non-conductive member is filled in the holes, and the non-conductive member covers at least a portion of the internal surface and the sidewall.

2. The housing as claimed in claim 1, wherein the bases are made of a metal, an antenna is positioned in the housing and aligns with the gap.

3. The housing as claimed in claim 1, wherein the holes have a diameter of 10 nm to 300 nm.

4. The housing as claimed in claim 1, wherein the lateral surfaces, the bottom surfaces and the top surfaces all have oxide layer, the oxide layers have holes having a diameter of 10 nm to 300 nm, the non-conductive member is filled in the holes of the oxide layers.

5. The housing as claimed in claim 1, wherein the gap has a width of 0.1 mm to 0.3 mm, portions of the non-conductive member positioned in the gap have a width of 0.1 to 0.3 mm.

6. The housing as claimed in claim 1, wherein a number of the gap is two, the two gaps are located at two opposite sides of the housing, such that housing is spaced by the gaps, and forming three bases.

7. The housing as claimed in claim 1, wherein a number of the gap is one, the gap is formed within the housing.

8. An electronic device, comprising: a body; a housing having: two bases each having an internal surface and at least one sidewall, the internal surface adjacent to the sidewall and the sidewall having a plurality of grooves; a gap defined between the two bases; and a non-conductive member being positioned in the gap, and filled into the grooves to enhance bonding strength between the non-conductive member and the two bases; and an antenna assembled in the housing; wherein each groove has two opposite lateral surfaces and a bottom surface adjacent to the lateral surfaces, a plurality of partitions are located between two adjacent grooves, each partition includes a top surface; the lateral surfaces, the bottom surfaces and the top surfaces all have holes, the non-conductive member is filled in the holes, and the non-conductive member covers at least a portion of the internal surface and the sidewall.

9. The electronic device as claimed in claim 8, wherein the holes have a diameter of 10 nm to 300 nm.

10. The electronic device as claimed in claim 8, wherein the lateral surfaces, the bottom surfaces and the top surfaces all have oxide layer, the oxide layers have holes having a diameter of 10 nm to 300 nm, the non-conductive member is filled in the holes of the oxide layers.

11. The electronic device as claimed in claim 8, wherein the non-conductive member and the gap correspond to the antenna.

12. The electronic device as claimed in claim 8, wherein the gap has a width of 0.1 mm to 0.3 mm, portions of the non-conductive member positioned in the gap have a width of 0.1 to 0.3 mm.

13. The electronic device as claimed in claim 8, wherein a number of the gap is two, the two gaps are located at two opposite sides of the housing, such that housing is spaced by the gaps, and forming three bases.

14. The electronic device as claimed in claim 8, wherein a number of the gap is one, the gap is formed within the housing.

* * * * *